I. N. LERICK.
Improvement in Fences.
No. 129,738.            Patented July 23, 1872.
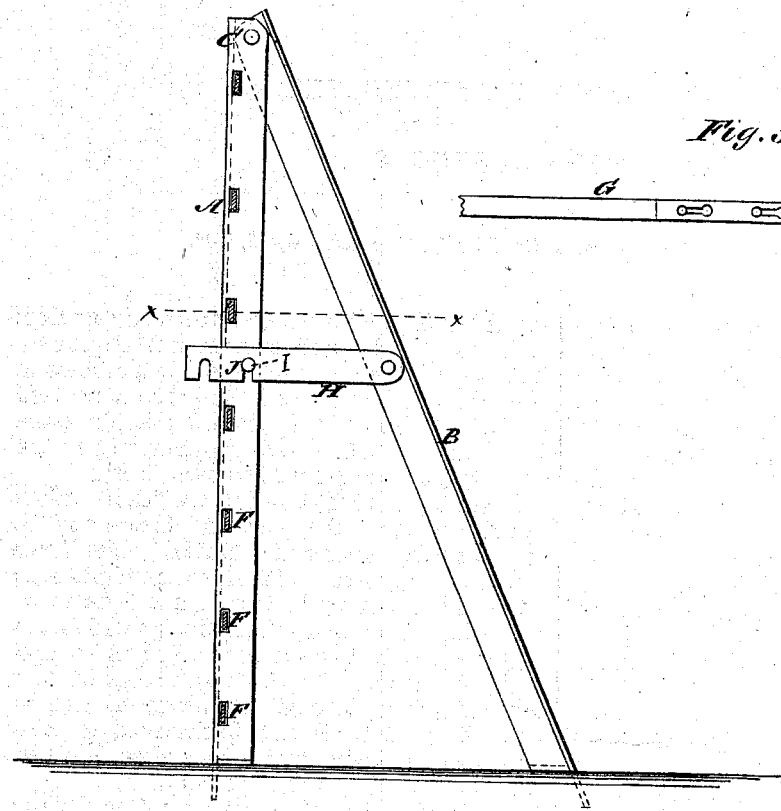
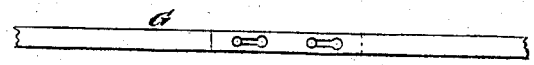
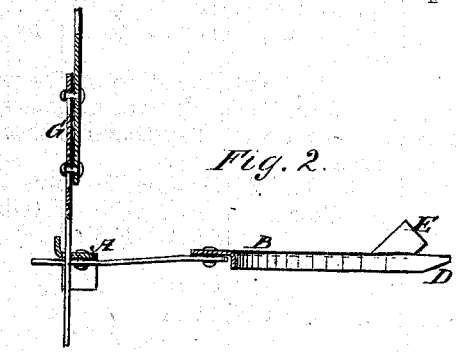
Witnesses:
E. Wolff
N. O. Graham
Inventor:
Isaac N. Lerick
per
Attorneys.

UNITED STATES PATENT OFFICE.

ISAAC N. LERICK, OF SAN ANTONIO, TEXAS.

IMPROVEMENT IN FENCES.

Specification forming part of Letters Patent No. 129,738, dated July 23, 1872.

Specification describing a new and useful Improvement in Iron Fences, invented by ISAAC N. LERICK, of San Antonio, in the county of Bexar and State of Texas.

In western Texas, where fence timber is extremely scarce and expensive, a resort to iron as a material for fencing is a necessity; and the object of this invention is to so construct an iron fence that in point of cheapness and durability it may be used as a substitute for wood. The present invention consists in the construction and arrangement of parts hereinafter described.

In the accompanying drawing, Figure 1 represents an elevation of the post and brace. Fig. 2 is a horizontal section looking down from the line $x\ x$ of Fig. 1. Fig. 3 is a view of the rail, showing the splice.

Similar letters of reference indicate corresponding parts.

A is the post, which is made of band-iron or thin angle-iron. If of the former, the band-iron is turned or bent to form angle-iron. B is the brace attached to each post and formed of the same kind of iron. These two parts are pivoted together at their top ends, as seen at C. The lower ends of both are split at the angle, one part extending down into the ground and the other part is turned to near a right angle, and rests upon the ground. D represents the former and E the latter. F represents mortises or orifices through the posts for the rails. The rails G are made endless and are spliced together, as seen in Fig. 2, by button-rivets in one part and button-holes in the other. The post and the brace B are tied together by the bar H, which is pivoted to the brace and is hooked onto the button I in the post by means of slots J, as seen in Fig. 1.

It will be seen that the rails are readily taken apart, and that the post and brace can be folded up by raising the bar H. This fence can be transported with ease from place to place or laid away in a compact form when not required for use. It is designed to keep it covered with a good coat of paint to prevent corrosion. The flexible nature of this fence allows it to be set on uneven as well as on level ground. It may be fastened down so as to resist the wind by hooks, stakes, or otherwise, as may be found necessary.

Having thus described my invention, I claim as new and desire to secure by Letters Patent—

1. A fence consisting of the post A, brace B, and rails G, when the same are constructed and connected together substantially as described.

2. The rails G, when the same are connected together as shown and described.

ISAAC NEWTON LERICK.

Witnesses:
J. A. BARRET,
JAS. N. FISK.